United States Patent
Shiraishi et al.

(10) Patent No.: US 7,853,084 B2
(45) Date of Patent: Dec. 14, 2010

(54) METHOD OF DETECTING FEATURE IMAGES

(75) Inventors: Masao Shiraishi, Kawasaki (JP); Yasuyuki Oki, Yokohama (JP); Masaru Igawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1152 days.

(21) Appl. No.: 11/488,028

(22) Filed: Jul. 18, 2006

(65) Prior Publication Data

US 2007/0127843 A1    Jun. 7, 2007

(30) Foreign Application Priority Data

Dec. 5, 2005    (JP) .............................. 2005-350616

(51) Int. Cl.
*G06K 9/36* (2006.01)

(52) U.S. Cl. ...................................... 382/192; 382/276

(58) Field of Classification Search ................... 382/276
See application file for complete search history.

(56) References Cited

U.S. PATENT DOCUMENTS

| | | | |
|---|---|---|---|
| 4,807,033 A | 2/1989 | Keesen et al. | |
| 6,140,991 A | 10/2000 | Miyabe | |
| 6,937,764 B2 * | 8/2005 | Sakamoto et al. | ............ 382/195 |
| 2002/0141619 A1 * | 10/2002 | Standridge et al. | .......... 382/107 |
| 2003/0123726 A1 | 7/2003 | Suh | |

FOREIGN PATENT DOCUMENTS

| | | |
|---|---|---|
| EP | 0 989 759 | 3/2000 |
| EP | 1 653 727 | 5/2006 |
| JP | 9-284667 | 10/1997 |
| JP | 2002-330453 | 11/2002 |
| JP | 2005-284394 | 10/2005 |
| KR | 10-2005-0018656 | 2/2005 |
| WO | WO 03/090168 | 10/2003 |

* cited by examiner

*Primary Examiner*—Samir A. Ahmed
*Assistant Examiner*—John W Lee
(74) *Attorney, Agent, or Firm*—Antonelli, Terry, Stout & Kraus, LLP.

(57) ABSTRACT

It is an object of the present invention to detect an image correction method from corrected images, in order to grasp a correction method of a correctly corrected images as a guideline for correction of a harmful image, and to present an image correction proposal to which a correction method in the past is applied, in order to indicate to a corrector a guideline for correction of the harmful image. In order to achieve the above-described objective, the present invention employs the following configuration. With respect to a harmful image data before correction and an image data after correction, a scene feature quantity representing the feature quantity of a scene for each scene of a video is calculated, and by comparing chronological lists of the respective scene feature quantities of the videos, a correction method for the scene configuration is detected.

6 Claims, 7 Drawing Sheets

METHOD OF DETECTING FEATURE IMAGES

INCORPORATION BY REFERENCE

The present application claims priority from Japanese application JP2005-350616 filed on Dec. 5, 2005, the content of which is hereby incorporated by Reference into this application.

BACKGROUND OF THE INVENTION

The present invention relates to techniques of carrying out correction of feature images which satisfy a predetermined condition. The present invention also includes techniques of detecting special images for the purpose of correction. In addition, the special images also include harmful images which may cause a harm to a human body. Therefore, the present invention relates to a method of detecting harmful images, a method of detecting differences in images, and an apparatus, and in particular relates to a method of detecting harmful images, a method of detecting differences in images, and an apparatus, wherein a difference in the scene configurations of two images is detected to detect the difference in the images. In addition, the harmful images include a flash, rapidly changing image sequences, a subliminal image, and the like.

In editing images, edition such as deleting and correcting of the feature images is needed. Particularly, with regards to harmful images, there is such a need to do this because of the following reasons. It has been generally found that images such as a flicker image contained in a video which repeats a flash within a short duration, and a subliminal image in which an image of such short duration that people cannot recognize is inserted, may cause a harm to a human body. There are inter-individual differences in the degree of influence on a human body from such images, and even if viewing the same image, there exist influenced people and uninfluenced people. Moreover, this influence is said to vary also depending on the environment for viewing images, and also relates to a positional relationship between a viewer and a video monitor, and to the brightness condition at a place for viewing.

If the above-described images come into a video such as in TV broadcast which a general public views, the area of influence is extremely huge, and the social liability at the video provider side may be accused. Therefore, video providers, such as a TV station, who provides video to a general public, checks and detects in advance whether such a harmful image has not come into before providing the video. Moreover, National Association of Commercial Broadcasters in Japan (NAB) whose members are broadcasting industry people has set a guideline on such harmful images.

Because an example of the harmful image is a change in a video within a short duration (from several frames to several seconds), it is difficult to visually check sufficiently, and in case of visual check a personal view of an examiner may enter. The influence of the harmful image also depends on the environment at the viewer side, so even if it is determined that a video does not have a problem under an environment of the examination, an influence may be caused depending on the actual condition of viewing.

For this reason, a conventional technique concerning a method of mechanically examining the harmful image is described in U.S. Pat. No. 6,937,764. In this conventional technique, a flash scene of video is detected and a feature quantity and a static image of the detected portion at the time of detection are presented as the detection results.

In the conventional technique described above, only mechanical detection of the harmful image can be carried out and there is no guideline how to correct the detected harmful image, and therefore how to carry out correction with respect to the detected harmful image is not known is a problem. For this reason, the examination result cannot be informed successfully to the video producer, so the corrected video by the video producer may be detected as a harmful image again. Especially, in case of TV broadcasting, the examiner of the harmful image belongs to a TV station and a corrector of the video belongs to the video production, in other words the examination and correction are often carried out by different organizations and different people, thereby causing the above-described problem.

In order to solve the above-described problem, it may be considered that as a guideline of correction of the harmful image, a correction method, with which correction was made due to a similar reason in the past and it was judged that the correction causes no problem, is utilized. In this case, people need to grasp the correction method of the image which was corrected in order to store the correction method of the image. However, even if only the corrected video is provided by the video corrector, and even if the correction method is provided from the corrector, there is no way to assure that the provided correction method is correct, thus causing a problem that the method of correcting image cannot be grasped correctly.

SUMMARY OF THE INVENTION

It is an object of the present invention to allow, as a guideline for correction of a feature image containing a harmful image, an image correction method to be detected from the corrected images in order to grasp the correction method with which the image was corrected correctly. Further, it is another object of the present invention to allow a correction proposal of the image, to which a correction method in the past is applied, to be presented in order to indicate to the corrector the guideline for correction of the feature image.

The above objective is realized with the following configuration, wherein a feature image (or an image containing this feature) and an edited image, which is made by applying edition to the feature image, are associated and stored in a database in advance, and if it is detected that an image currently to be edited (or to be examined) is a feature image, then a feature image "similar" to the one currently to be edited is retrieved from a database and the edited contents of an edited image corresponding to the retrieved feature image is identified and presented to a user. Here, the edited contents may be identified comparing the retrieved feature image with the edited image corresponding thereto. Moreover, the feature image and the edited contents may be associated and stored in the database, and the edited contents stored corresponding to the retrieved feature image may be identified.

In addition, a "similar" one refers to the one mutually having a predetermined relationship, and the specific contents of the predetermined relationship include the ones as described in the embodiments of the present invention. In addition, as an aspect of the present invention, the following is targeted for harmful images. According to the present invention, the above objective can be achieved by using a harmful image detecting method of detecting harmful images and presenting a detection result, provided with a database in which correction case examples with respect to the harmful images in the past are stored, the method comprising the steps of: detecting whether or not a harmful image is contained in an inputted video to be examined; if the feature image is contained, retrieving the database by using a reason of harm of the detected harmful image as a key and thereby obtaining a correction case example; creating a correction proposal by applying the correction case example to a harmful portion of the image; and outputting the reason of harm, the harmful portion, and the correction proposal of the detected feature image for the purpose of correction of the harmful image.

Moreover, the above objective can be achieved by using a harmful image detecting method of detecting harmful images and presenting a detection result, provided with a database, in which correction case examples with respect to the harmful images in the past are stored, and an image difference detecting means, the method comprising the steps of: inputting a video of after carrying out correction to the harmful image as a video to be examined; detecting whether or not the harmful image is contained in this video; if the harmful images is not contained, the image difference detecting means calculating a scene feature quantity for the video before correction and the video after correction on the basis of a feature quantity of a frame image within a scene, comparing chronological lists of the respective scene feature quantities of the two videos, detecting a difference in the scene configurations of the two videos from the difference in the lists of the scene feature quantities, and detecting a correction method to store the same in the database.

Moreover, the above objective can be achieved by using an image difference detecting method of detecting a difference in two videos each consisting of a plurality of scenes, the method comprising the steps of: calculating scene feature quantities based on the feature quantities of frame images within the scenes of two videos, and comparing chronological lists of the respective scene feature quantities of the two videos; and detecting a difference in the scene configurations of the two videos from a difference in the lists of the scene feature quantities.

According to an embodiment of the present invention, an image correction method can be detected from a corrected image and the image before correction, and a correction proposal with respect to the harmful image which was detected in detecting a harmful image can be presented.

Other objects, features and advantages of the invention will become apparent from the following description of the embodiments of the invention taken in conjunction with the accompanying drawings.

DESCRIPTION OF THE INVENTION

Hereinafter, the embodiments of a method of detecting harmful images, an image difference detecting method, and an apparatus, in which the present invention is applied to harmful images, will be described in detail with reference to the accompanying drawings.

Figure 1:
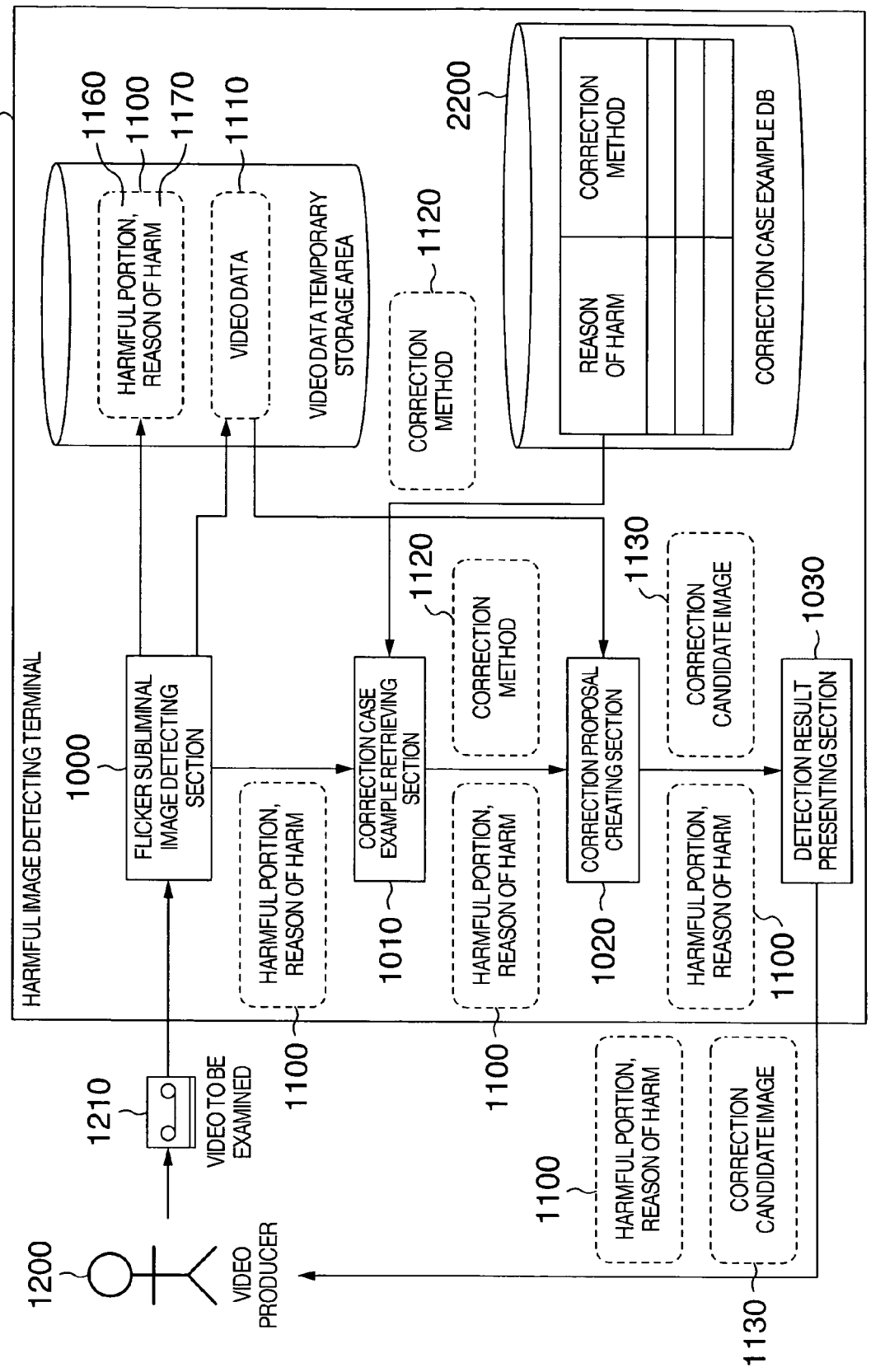
FIG. 1 is a block diagram showing a functional configuration and a process of a harmful image detecting system, in which a correction method in the past obtained by using an image difference detecting apparatus according to a first embodiment of the present invention is applied to thereby present a correction proposal of the harmful image.

FIG. 1 is a block diagram showing a functional configuration and a process of a harmful image detecting system, in which a correction method in the past obtained by an image difference detecting apparatus according to a first embodiment of the present invention is applied to thereby present a correction proposal of the harmful image. In FIG. 1, a reference numeral 1000 represents a flicker subliminal image detecting section, 1010 represents a correction case example retrieving section, 1020 represents a correction proposal creating section, 1030 represents a detection result presenting section, 1100 represents a detection result data, 1110 represents a harmful image data, 1120 represents a correction method, 1130 represents a correction candidate image, 1160 represents a harmful portion, 1170 represents a reason of harm, 1200 represents a video producer, 1210 represents a video to be examined, 2000 represents a harmful image detecting terminal, and 2200 represents a correction case example DB. Here, the harmful image detecting terminal 2000 is realized by the so-called computer. Then, the flicker subliminal image detecting section 1000, the correction case example retrieving section 1010, the correction proposal creating section 1020, and the detection result presenting section 1030, which are the configuration elements, can be realized as a processor (CPU) which carries out the process in accordance with a program. Moreover, the harmful image detecting terminal 2000 may comprise the above-described program, a storage device and a memory for storing programs (not shown), and the like.

The harmful image detecting terminal 2000 shown in FIG. 1 has functions required in the processes of detecting harmful images from the video 1210 to be examined which the video producer 1200 produced, and of creating a correction proposal from the correction case examples in the past to return this to the video producer 1200. This harmful image detecting terminal 2000 comprises the flicker subliminal image detecting section 1000, the correction case example retrieving section 1010, the correction proposal creating section 1020, the detection result presenting section 1030, and a temporary image data storage device, and the correction case example DB 2200.

The video to be examined 1210, which the video producer 1200 produced and which is to be inputted to the harmful image detecting terminal 2000, may be recorded on a media, such as a VTR tape, or may be expressed in the form of file, such as MPEG. In case of a VTR tape, the video to be examined 1210 is reproduced on a VTR deck and inputted to the harmful image detecting terminal 2000. Moreover, if the video to be examined 1210 is constituted in the form of file, the video to be examined 1210 may be inputted to the harmful image detecting terminal 2000 as is.

The flicker subliminal image detecting section 1000 in the harmful image detecting terminal 2000 detects, with respect to the inputted video to be examined, a flash repeated within a short duration and an insertion of an image within such a short duration that a human cannot be aware of. With respect to this detection, a reference level for a flash or the like may be stored in advance with which the video to be examined is compared, and if satisfying the reference level it may be determined that there exists an insertion. Moreover, the conventional technique described above may be employed. These are the images which may have a harmful effect on a human body. The flicker subliminal image detecting section 1000 outputs as a detection result the detection result data 1100 which is a combination of the harmful portion 1160 and the reason of harm 1170 of the video The harmful portion 1160 is a time data (time stamp) indicating the position of the video. If the time code information is given to a record media of a video or to a video file, this time data serves as the time code value thereof, and if there is no time code information, the time code value is the elapsed time after the start of the video. For example, in case of indicating a portion of ten minutes after the start of the video, the time data is a value of "00:10:00:00". These are the values capable of uniquely indicating the position of the video.

The reason of harm 1170 is a data which indicates a factor detecting a harmful image. In this data, if the harmful image is a flicker image, there are included the respective information on the "time length of a flash interval", "rate of change in luminance (%)", "frequency of change in luminance", "color component", and "portion on a screen causing a flash", and if the harmful image is a subliminal image, there are included the respective information (factors) on the "time length of an inserted subliminal image", and "portion of the subliminal image on a screen".

Here, if all the respective factors are "similar" to each factor of the reason of harm stored in the correction case example DB 2200, or if a certain number or more of factors are "similar" thereto, it may be determined that this data is "similar" in terms of the image.

Moreover, if the difference between the respective factors of the video to be examined 1210 and of the reason of harm stored in the correction case example DB 2200 is within a certain range, the "similarity" of the respective factors may be determined as being "similar", or may be judged as the "similarity" of each factor as follows:

Time length of a flash interval: that of the video to be examined 1210 is longer within a certain area (including the same time length).

Rate of change in luminance (%): that of the video to be examined 1210 is larger within a certain area (including the same rate of change).

Frequency of change in luminance: that of the video to be examined 1210 is larger within a certain area (including the same frequency).

Color component: the hue of the video to be examined 1210 is nearer to that of the harmful color (including the same hue).

Portion on a screen causing a flash: that of the video to be examined 1210 is nearer to the center on the screen (including the portion whose nearness thereto is the same).

Moreover, each factor may be retrieved by comparing with each factor of the reasons of harm stored in the correction case example DB 2200, respectively. Moreover, the comparison can be made as follows. Namely, with regard to a first factor, (a harmful image of) a "similar" reason of harm is retrieved, and then among the retrieved reasons of harm the one with a second factor being "similar" is retrieved. Then the one with a third factor being "similar" is retrieved and so on, whereby the one with all factors being "similar" or the one with a predetermined factor being "similar" is identified.

The flicker subliminal image detecting section 1000 records the detection result data 1100 in the temporary image data storage device and passes this to the correction case example retrieving section 1010. Moreover, in the process of detecting the harmful image, the harmful image data 1110, in which a harm of the video inputted for detection was detected, is recorded in the temporary image data storage device. This image data 1110 is created and recorded as a proxy video in which the resolution and bit rate of the video is reduced.

Upon receipt of the detection result data 1100, the correction case example retrieving section 1010 retrieves from the correction case example DB 2200 whether or not there is any correction case example due to the similar reason of harm in the past by using the reason of harm 1170 of the detection result data 1100 as a search key. If there is a correction case example due to the similar reason of harm, the correction case example retrieving section 1010 obtains the correction method 1120 corresponding thereto. The correction method 1120 includes information on the modification of a scene configuration or the modification of editing effect on a scene. The detail of the data configuration of the correction method 1120 will be described later. With regard to the correction method 1120 in the past, only one correction method corresponding to a reason most similar to the detected reason of harm 1170 may be obtained, or a plurality of correction methods corresponding to the reason having a similarity within a certain threshold may be obtained based on the degree of similarity of the reason of harm. The correction case example retrieving section 1010 passes the detection result data 1100 and the correction method 1120 to the correction proposal creating section 1020.

The correction proposal creating section 1020 obtains the image data 1110 from the temporary image data storage area, and applies to the portion of the image indicated as the harmful portion 1160 a modification of a scene configuration or a modification of the editing effect on a scene in accordance with the contents indicated by the correction method 1120, and then creates the correction candidate image 1130. The detail of this process will be described later. The correction proposal creating section 1020 passes the detection result data 1100 and the correction candidate image 1130 to the detection result presenting section 1030.

The detection result presenting section 1030 displays the harmful portion 1160, the reason of harm 1170, and the correction candidate image 1130 as a detection result of the harmful image on a monitor of the harmful image detecting terminal 2000. Moreover, these data are outputted as a data file.

If a harmful image was not detected in the inputted video to be examined 1210 at the flicker subliminal image detecting section 1000, the processes in the correction case example retrieving section 1010 and the correction proposal creating section 1020 are not carried out, and instead a message indicating that a harmful image was not detected at the detection result presenting section 1030 is displayed. The video to be examined 1210 which passed the examination will be utilized as such without being corrected. If it is a video for broadcasting, it is used for broadcasting.

If a harmful image was detected from the inputted video to be examined 1210, an examiner delivers to the video producer 1200 the detection result data 1100 and the correction candidate image 1130 which are outputted by the detection result presenting section 1030. Note that, as the process of delivering this data to the video producer 1200, other than that a medium in which it is stored is delivered by hand, the detection result data 1100 of interest may be sent via a network to a processing apparatus which the video producer 1200 uses.

The video producer 1200 carries out a correction work of the video based on the delivered contents. The correction of the video is implemented by carrying out the image editing processes, such as replacing of the scene configuration, inserting and deleting of a scene, modifying of the scene length, modifying of the flashing luminance, modifying of the frequency of flashing. The corrected video is subject to an examination for the presence of a harmful image, again.

Figure 2:
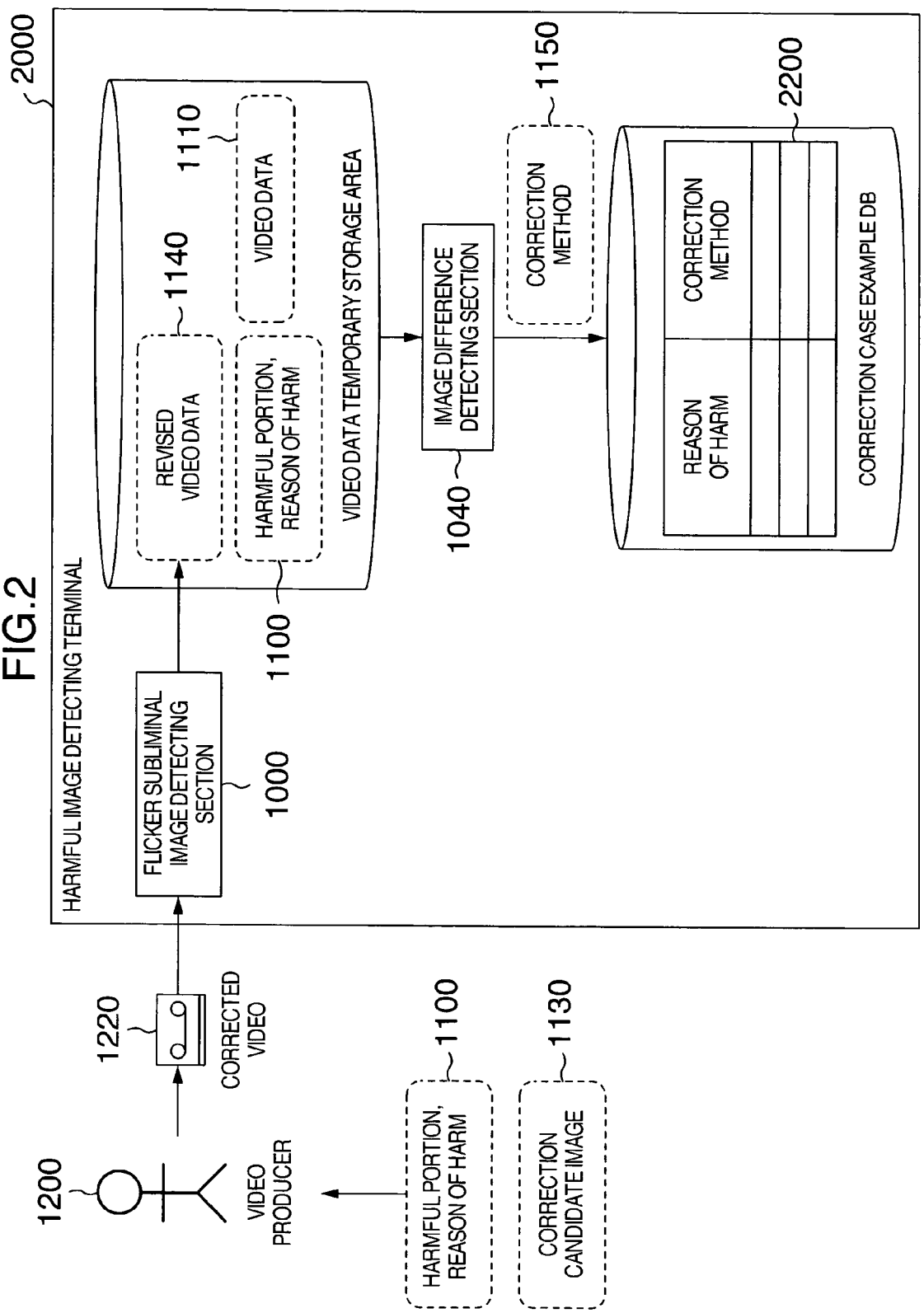
FIG. 2 is a block diagram showing a functional configuration and a process of a harmful image detecting system which detects a correction method by using the image difference detecting apparatus according to the first embodiment of the present invention and stores this as a case example, when re-examining the corrected image.

FIG. 2 is a block diagram showing a functional configuration and a process of the harmful image detecting system which detects, in the re-examination of the corrected video, a correction method by using the image difference detecting apparatus according to the first embodiment of the present invention and stores this as a case example. In FIG. 2, a reference numeral 1040 represents an image difference detecting section, 1140 represents a revised image data, 1150 represents a correction method, and other numerals are the same as those of FIG. 1. In addition, the image difference detecting section 1040 shown in FIG. 2 is to be included in the harmful image detecting terminal 2000 shown in FIG. 1, and only the configuration required for the image difference detection is shown in FIG. 2 for convenience of description. Moreover, similarly, as described in FIG. 1, the harmful image detecting terminal 2000 comprises a computer having a processor and the like, and carries out each process in accordance with the program.

With respect to a video 1220 which was corrected based on the detection result data 1100 and the correction candidate image 1130 presented by the processes shown in FIG. 1, an examination for the presence of a harmful image is carried out again at the flicker subliminal image detecting section 1000. If a harmful portion is detected again in this examination, the processes shown and described in FIG. 1 are carried out again, and the detection result data is informed to the video producer 1200, causing he or she to carry out a re-correction of the video.

If a harmful portion is not detected at the flicker subliminal image detecting section 1000 (i.e., if the correction was made successfully), the flicker subliminal image detecting section 1000 records the video inputted for the purpose of detection into the temporary image data storage device as the revised image data 1140 like in the process shown in FIG. 1. The image data 1140 to be recorded is a proxy video in which the resolution and bit rate of the video are reduced. Then, the process moves to the image difference detecting section 1040.

The image difference detecting section 1040 detects a relevant correction method by comparing the revised image data 1140 which is the image data after correction with the image data before correction 1110. The detected correction method is outputted as the correction method 1150 of the image. The correction method 1150 is associated with the reason of harm and is recorded in the correction case example DB 2200.

Figure 3:
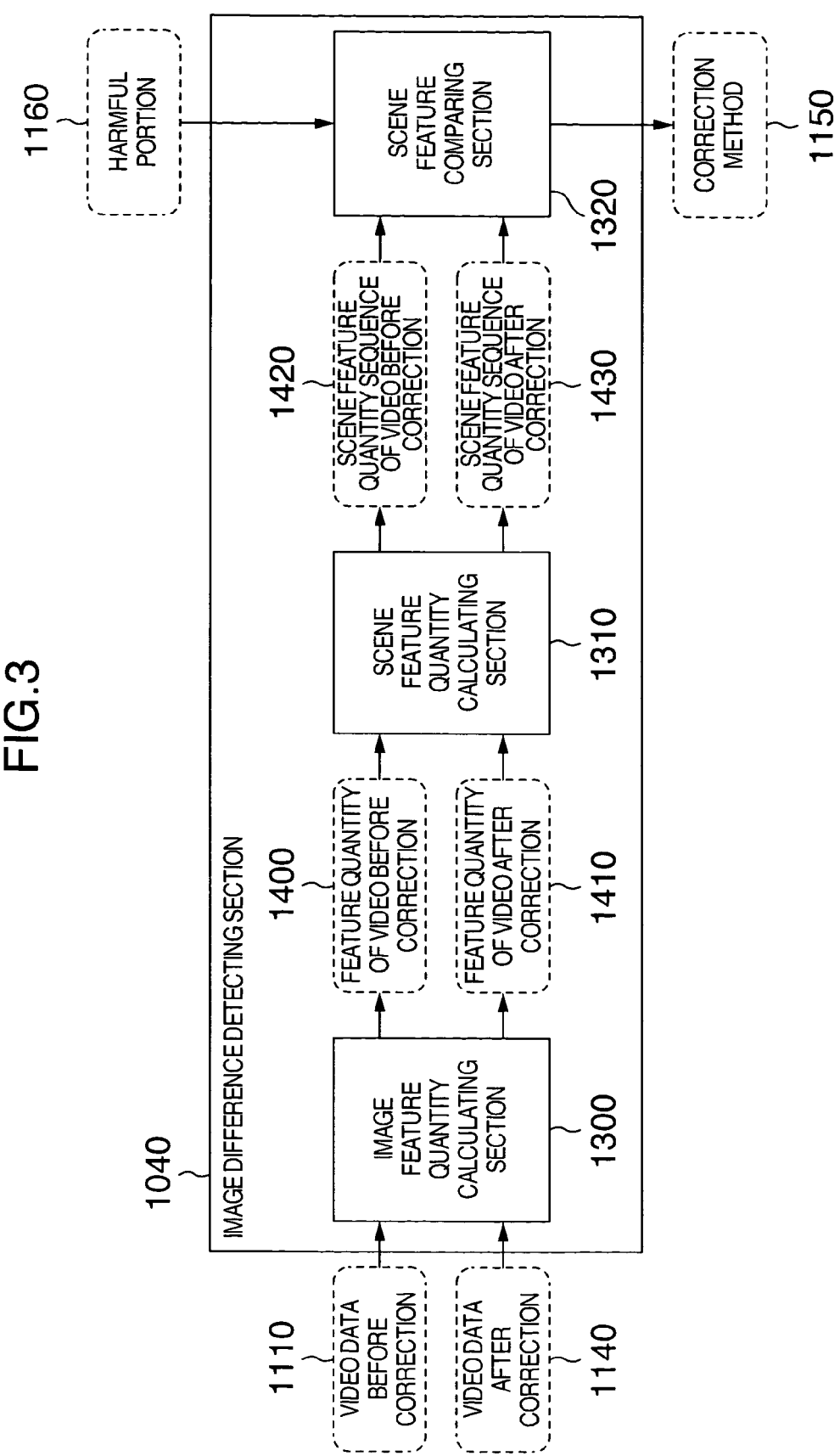
FIG. 3 is a block diagram showing a functional configuration and a process of the image difference detecting section.
Figure 4:
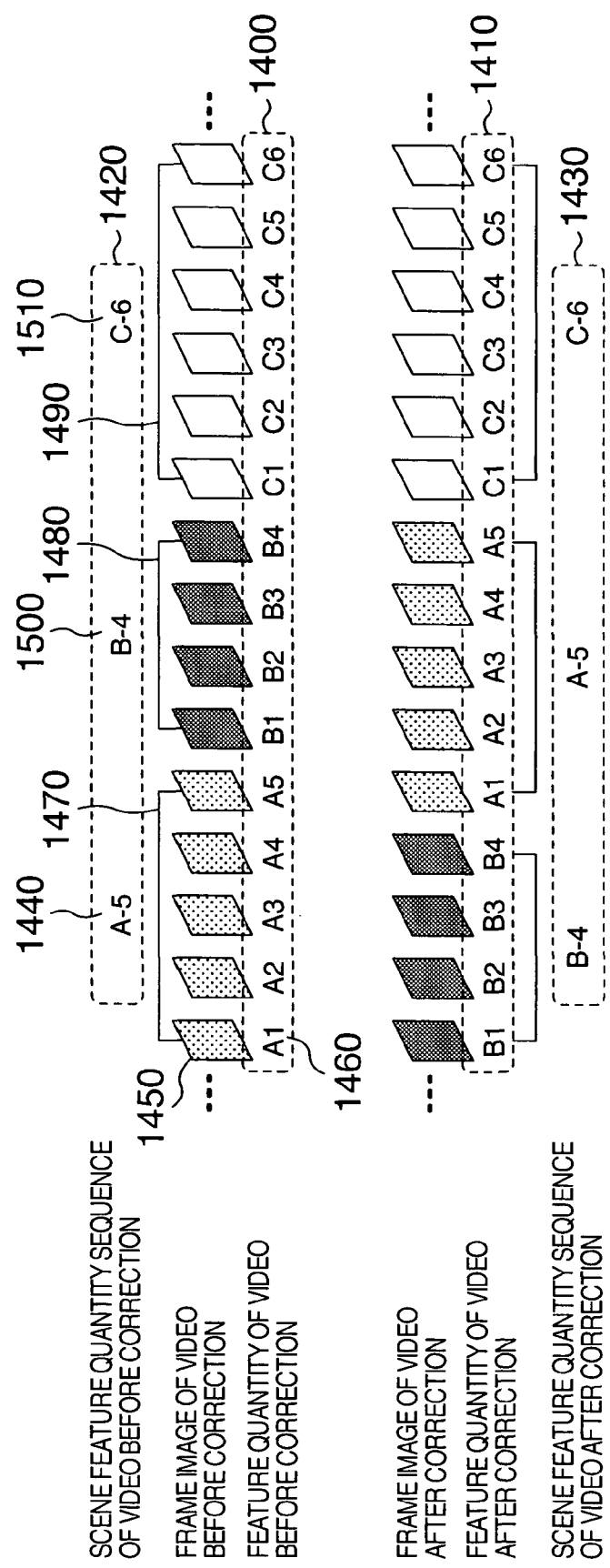
FIG. 4 is a view explaining a relationship between an image feature quantity and a scene feature quantity in a process of detecting a correction method.

FIG. 3 is a block diagram showing a functional configuration and a process of the image difference detecting section 1040. FIG. 4 is a view explaining a relationship between an image feature quantity and a scene feature quantity in the process of detecting a correction method. Next, the detail of the process in the image difference detecting section 1040 will be described with reference to FIG. 3 and FIG. 4. In FIG. 3 and FIG. 4, a reference numeral 1300 represents an image feature quantity calculating section, a reference numeral 1310 represents a scene feature quantity calculating section, and a reference numeral 1320 represents a scene feature quantity comparing section.

The image difference detecting section 1040 comprises the image feature quantity calculating section 1300, the scene feature quantity calculating section 1310, and the scene feature quantity comparing section 1320. In the image difference detecting section 1040, upon input of the revised (after correction) image data 1140 and the image data before correction 1110, the image feature quantity calculating section 1300 first calculates, with respect to the image data before correction 1110 and the image data after correction 1140, an image feature quantity after correction 1410 and an image feature quantity before correction 1400, respectively, which are the feature quantities of each frame image, and outputs this. This feature quantity is calculated as one feature quantity 1460 corresponding to each one frame image 1450, as shown in FIG. 4. A chronological list of these feature quantities is referred to as the image feature quantity, and such image feature quantity is outputted from the image feature quantity calculating section 1300 corresponding to the image data before correction 1110 and the image data after correction 1140. The feature quantity of a frame image refers to values indicative of the features of the image, such as a luminance histogram and a color histogram of the image.

The scene feature quantity calculating section 1310 receives the image feature quantities before and after correction 1400 and 1410 outputted from the image feature quantity calculating section 1300, as the inputs, and calculates the feature quantities with respect to these feature quantities for each scene. A scene is formed by grouping the frame images based on their similarity when chronologically looking at the feature quantities of the frame images. For example, in FIG. 4, with respect to frame image feature quantities A1-C6 of the image feature quantity 1400, if the degree of similarity among the frame images contained in each set of "A1 to A5", "B1 to B4", and "C1 to C6" is high, a set of the frame images corresponding to "A1 to A5" is called as a scene A1470, a set of "B1 to B4" as a scene B1480, and a set of "C1 to C6" as a scene C1490. The video of these scenes shows a series of images shot by one camera work, and is generally called a "cut".

The scene feature quantity is a value representing the feature of a scene, and although in the embodiment of the present invention an average of the feature quantities of the frame images constituting a scene is used, the feature quantity of a start frame of the scene may be used, or a mean value of the feature quantities of the frame images constituting a scene may be used. Moreover, the scene feature quantity includes information on the scene length. For example, the scene length of the scene A1470 of FIG. 4 is five. The "5" in a value "A-5" of the scene feature quantity 1440 of the scene A1470 indicates that the scene length is five frames, and the "A" in "A-5" indicates an average of the feature quantities of the frame images "A1 to A5".

A chronological list of scene feature quantities is referred to as a "scene feature quantity sequence". A scene feature quantity sequence 1420 includes a list of the scene feature quantity 1440 of the scene A1470, the scene feature quantity 1500 of a scene B1480, and the scene feature quantity 1510 of a scene C1490.

The scene feature quantity calculating section 1310 calculates scene feature quantity sequences 1420 and 1430 with respect to the image feature quantities 1400 and 1410 and outputs this.

The scene feature quantity comparing section 1320 compares two scene feature quantity sequences 1420 and 1430 calculated by the scene feature quantity calculating section 1310 and detects a correction method of the image. The detail of the detection process in the image correction method by this scene feature quantity comparing section 1320 will be described with reference to FIG. 5.

Figure 5:
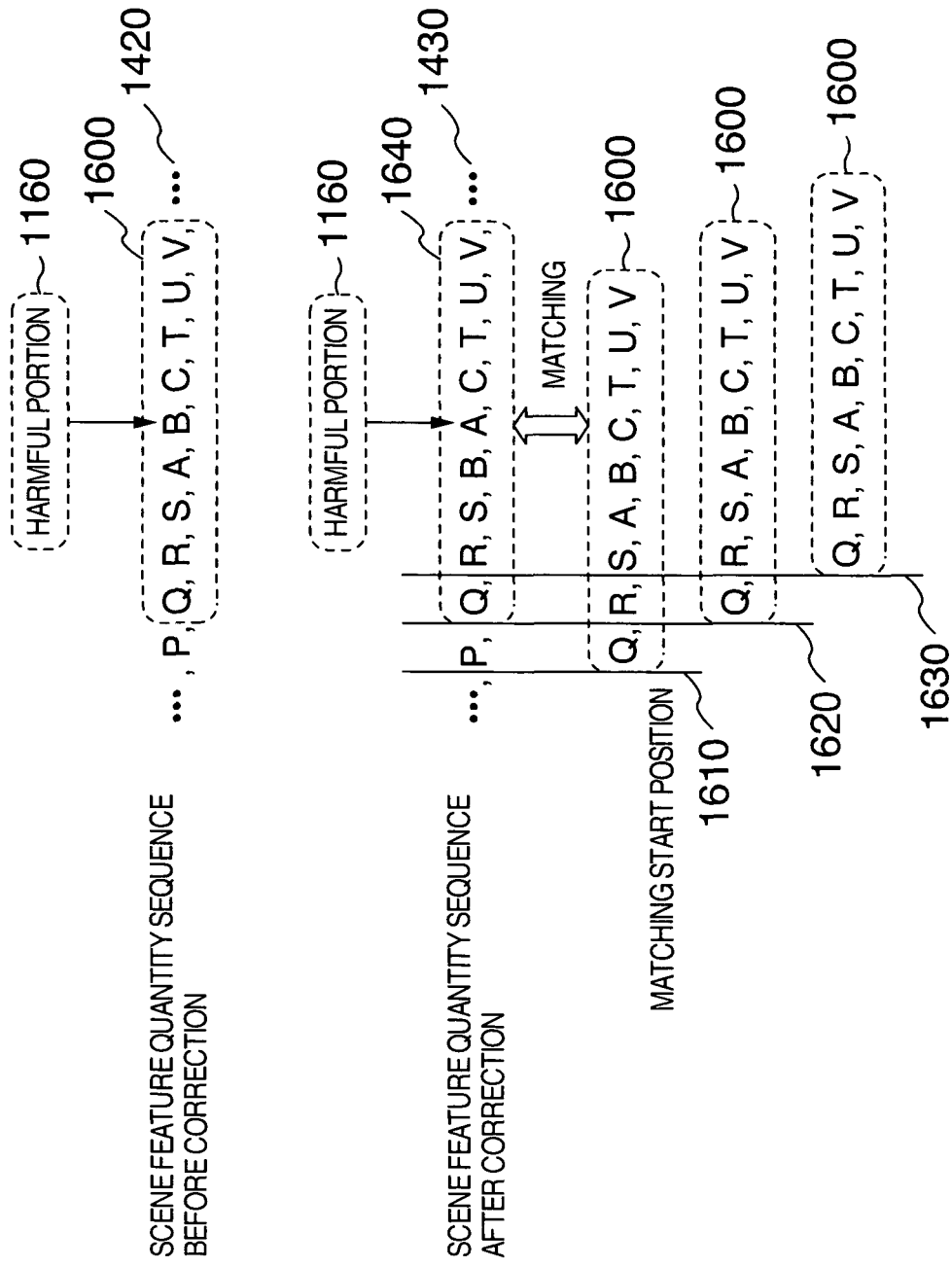
FIG. 5 is a view showing a relationship between a scene feature quantity sequence of a comparison source and a scene feature quantity sequence of a comparison destination in a matching process of detecting the correction method.

FIG. 5 is a view showing a relationship between the scene feature quantity sequence of a comparison source and the scene feature quantity sequence of a comparison destination in a matching process for detecting the correction method.

The detecting process of a video correction method is carried out by a procedure described below.

(1) Out of the scene feature quantity sequence 1420 of a video before correction, the scene feature quantities of n scenes before and after about a scene including a portion indicated by the harmful portion 1160 are extracted. The extracted scene feature quantities serve as a scene feature quantity sequence of a comparison source 1600. In an example shown in FIG. 5, n is set to 4.

(2) With respect to the portion indicated by the harmful portion 1160 of the scene feature quantity sequence 1430 of the video after correction, matching with the scene feature quantity sequence of the comparison source 1600 is carried out. The matching is carried out by carrying out a matching calculation about the corresponding scenes between the scene feature quantity sequence of the comparison source 1600 extracted from the scene feature quantity sequence 1420 of the video before correction, and the scene feature quantity sequence 1600 extracted from the scene feature quantity sequence 1430 of the video after correction, while shifting by m scenes forward and backward relative to the position indicated by the harmful portion 1160 of the scene feature quantity sequence 1430 of the video after correction. The matching calculation is a calculation, wherein a total sum of the differences between the scene feature quantities is calculated to thereby make a position where the total sum becomes the lowest to be the matching position. In an example shown in FIG. 5, m is set to 1, and the matching calculation is carried out while shifting the position from the matching start position 1610 to 1620, and to 1630, one scene after another. In this example, the matching position is determined as 1620. Then, a portion of the scene feature quantity sequence 1430 of the images after correction corresponding to the matching position is made a scene feature quantity sequence 1640 of the comparison destination.

(3) The respective scenes of the scene feature quantity sequence of the comparison source 1600 and of the scene feature quantity sequence of the comparison destination 1640 are compared for each scene to thereby detect the difference between the scene feature quantities. The difference of the scene feature quantities of the scene feature quantity sequence of the comparison destination 1640 detected relative to the scene feature quantity sequence of the comparison source 1600 is treated as that the following image correction was made.

If it is detected that the difference in the detected scene feature quantities is due to a modification of the scene length, a correction for lengthening the scene length, or a correction for shortening the scene length was made.

If it is detected that the difference in the detected scene feature quantities is due to a change of the order of the scene feature quantities, a correction for changing the order of the scenes was made. For example, the scenes A, B, and C are changed to an order of the scenes B, A, and C.

If it is detected that the difference of the detected scene feature quantities is due to the presence of a new scene feature quantity, a correction for adding a new scene was made. For example, a scene X is inserted in the scenes A, B, and C to make scenes A, X, B, and C.

If it is detected that the difference in the detected scene feature quantities is due to a loss of a scene feature quantity, a correction for deleting a scene was made. For example, a scene B is deleted from the scenes A, B, and C to make scenes A and C.

If it is detected that the difference in the detected scene feature quantities is due to a similarity of the feature quantities, a correction for modifying a video effect of the scene was made. The detectable video effect varies depending on the type of the image feature quantity used in the scene feature quantity. For example, if a luminance histogram is used as the feature quantity, a modification in luminance can be detected. Examples of the image edition include the one wherein the luminance of a scene B out of the scenes A, B, and C is decreased to make a scene B' and make scenes A, B', and C, and the like. In addition, if the degree of similarity of the feature quantity is distant by a certain threshold or more, it is to be treated as that a new scene was inserted.

With respect to the modifications described above, one type of them may be carried out, or a plurality of them may be carried out simultaneously.

The scene feature quantity comparing section 1320 of the image difference detecting section 1040 shown in FIG. 3 carries out the above-described processes, and detects a correction method of the image, and creates the correction method 1150. The correction method 1150 comprises "a scene configuration before modification, a scene configuration after modification, and a scene to serve as a harmful portion". The scene configuration includes information on the scene length and the scene feature quantity.

The calculation of the feature quantity of each frame image in the image feature quantity calculating section 1300 shown in FIG. 3 may be targeted for only frame images in the periphery of the harmful portion 1160. In this case, the scene feature quantity sequence is calculated only with respect to the scenes in the periphery of the harmful portion 1160. The area for calculation of the feature quantity of the frame image may be only an area required for carry out the matching calculation of the scene feature quantity sequence of the comparison source 1600 and the scene feature quantity sequence of the comparison destination 1640.

Figure 6:
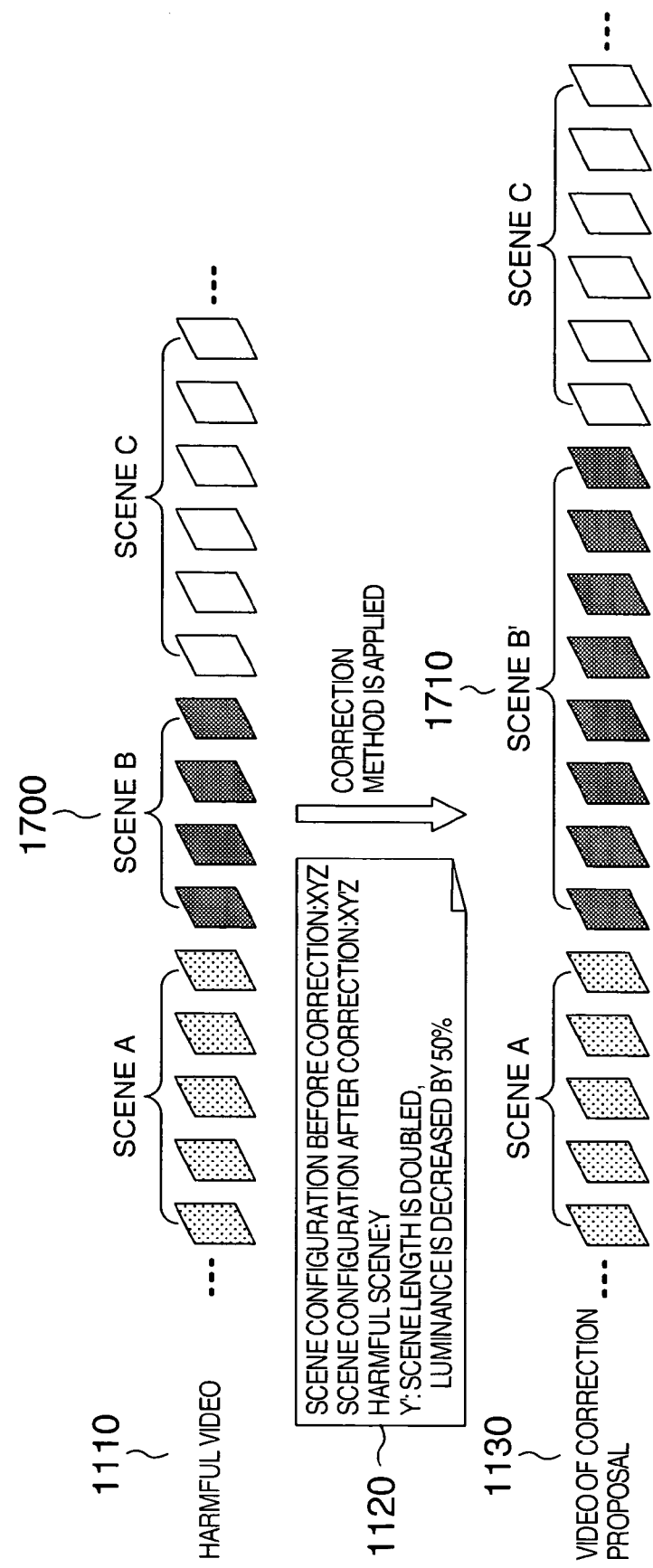
FIG. 6 is a view explaining an outline of a process in a correction proposal creating section in FIG. 1.

FIG. 6 is a view explaining an outline of the process at the correction proposal creating section 1020 in FIG. 1. Next, with reference to FIG. 6 the process will be described in which a correction method is applied to a harmful portion to thereby create a correction candidate image.

The correction proposal creating section 1020 applies, with respect to the harmful image data 1110 in which a harmful portion was detected, the correction method 1120, which was retrieved from the case example DB using a reason of harm as a key, and corrects the image with respect to a scene B1700 including the harmful portion of the harmful image data 1110 in accordance with the contents of the correction method 1120. According to the example shown in FIG. 6, in the correction method 1120 there is described that the scene length of the scene including the harmful portion is doubled and the luminance in the scene image is decreased by 50%. In accordance with these contents, the correction proposal creating section 1020 doubles the scene length of the scene B1700 and applies a process of decreasing the luminance by 50% and create a scene B'1710. Specifically, one frame image is added into each frame image of the scene B1700, and an image filtering is applied so that the luminance in each frame image may decrease by 50%. Through such processes, the correction candidate image 1130 as the correction proposal is created.

Figure 7:
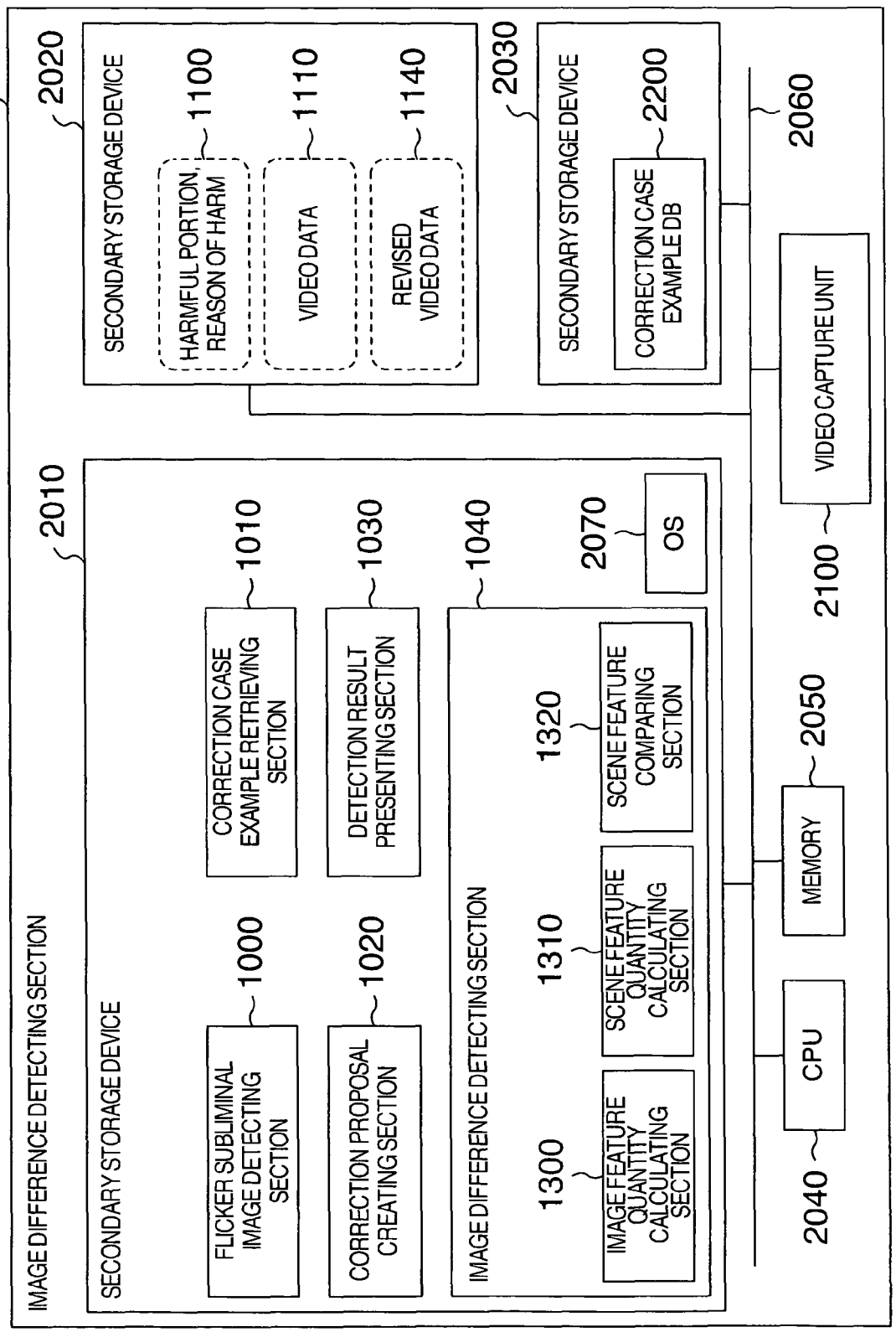
FIG. 7 is a block diagram showing a hardware configuration of a harmful image detecting terminal shown in FIG. 1 and FIG. 2.

FIG. 7 is a block diagram showing a hardware configuration of the harmful image detecting terminal 2000 shown in FIG. 1 and FIG. 2. In FIG. 7, reference numerals 2010, 2020, 2030 represent secondary storage devices, a reference numeral 2040 represents CPU, 2050 represents a memory, 2060 represents a bus, 2070 represents OS, and 2100 represents a video capture unit, and other numerals are the same as those shown in FIG. 1, FIG. 2, and FIG. 3. In addition, each configuration requirement (hardware) is just as described in FIG. 1 and FIG. 2.

The harmful image detecting terminal 2000 comprises the secondary storage devices 2010, 2020, and 2030, the video capture unit 2100 for receiving a video signal, CPU 2040, and the memory 2050, and these are connected via the bus 2060.

In the secondary storage device 2010, the flicker subliminal image detecting section 1000, the correction case example retrieving section 1010, the correction proposal creating section 1020, the detection result presenting section 1030, the image difference detecting section 1040, and the OS 2070 are stored. The image difference detecting section 1040 comprises the image feature quantity calculating section 1300, the scene feature quantity calculating section 1310, and the scene feature quantity comparing section 1320, as described in FIG. 3. The flicker subliminal image detecting section 1000 operates the image capture unit 2100 to obtain data of a frame image from the video signal.

The flicker subliminal image detecting section 1000, the correction case example retrieving section 1010, the correction proposal creating section 1020, the detection result presenting section 1030, and the image difference detecting section 1040, which are stored in the secondary storage device 2010, can be configured as a program to cause CPU provided by a computer to execute this program. Moreover, these programs can be stored in a recording media, such as FD, CDROM, and DVD, and provided, and can be provided in the form of digital information via a network.

The secondary storage device 2020 is used as a temporary storage area, and in this secondary storage device 2020 the detection result data 1100, the harmful image data 1110, and the corrected image data 1140, which the flicker subliminal image detecting section 1000 outputs, are stored. The correction case example DB 2200 is stored in the secondary storage device 2030.

The configuration overview of the secondary storage devices 2010, 2020, and 2030 are shown in the harmful image detecting terminal 2000 of FIG. 1 and FIG. 2. In addition, the secondary storage devices 2020 and 2030 may be the same one as the secondary storage device 2010.

In the embodiments of the present invention described above, a harmful image is detected, and a correction method is indicated based on a correction case example DB, and then the image difference detecting section compares the corrected image with the image before correction to extract a correction method, and this correction method is then reflected on the correction case example DB. However, the image difference detecting section can be used not only in a case where the images to compare are a harmful image and its corrected image, but also can be used in comparing two images having a certain relationship. For example, in the case where after creating an video for broadcasting or the like, a correction of the video is carried out based on instructions by a producer or the like, two videos are compared to extract a correction method and store this in a database, and at the time of subsequent video creation this correction method can be used by referring to the correction method in the database.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A feature image detecting method of detecting a feature image and presenting a detection result, the feature image detecting method using a database in which correction case examples regarding feature images in the past are stored, and an image difference detecting means, where the feature image detecting method is carried out by at least one processor unit and comprises:

inputting as a subject video to be examined, a video after carrying out a correction with respect to the feature image;

detecting whether or not the feature image is contained in this video;

if the feature image is not contained, the image difference detecting means calculating a scene feature quantity sequence of: a subject scene including a plurality of frame images for a video before correction and a corresponding scene including a plurality of frame images for the video after correction, on the basis of feature quantities of frame images within the scenes, comparing chronological lists of respective scene feature quantities of the scene feature quantity sequences of the two videos while shifting a comparing start position of the two videos with respect to each other by each predetermined amount of a plurality of predetermined amounts, detecting a difference in the scene configurations of the two videos from a difference in the lists of the scene feature quantities, detecting a correction method on a basis of difference in the scene configurations, and storing the same in the database.

2. The feature image detecting method according to claim 1, wherein the scene feature quantities are calculated based on a feature quantity concerning an editing effect of the video, the method further comprising detecting a difference in the scene configurations by detecting a difference in the editing effect applied to the scene from the difference in the scene feature quantities of the two videos, by comparison of the lists of the scene feature quantities.

3. The feature image detecting method according to claim 1, wherein the scene feature quantities are an average of the feature quantities of a frame image within the scene.

4. A feature image detecting apparatus for detecting a feature image and presenting a detection result, the apparatus comprising:

a database in which correction case examples with respect to feature images are stored; and an image difference detecting means; and a means for inputting as a subject video to be examined, a video after carrying out a correction with respect to the feature image, and detecting whether or not a feature image is contained in this video, wherein if the feature image is not contained, the image difference detecting means calculating a scene feature quantity sequence of: a subject scene including a plurality of frame images for a video before correction and a corresponding scene including a plurality of frame images for the video after correction, on the basis of feature quantities of frame images within the scenes, comparing chronological lists of respective scene feature quantities of the scene feature quantity sequences of the two videos while shifting a comparing start position of the two videos with respect to each other by each predetermined amount of a plurality of predetermined amounts, detecting a difference in the scene configurations of the two videos from a difference in the lists of the scene feature quantities, detecting a correction method on a basis of difference in the scene configurations, and storing the same in the database.

5. The feature image detecting apparatus according to claim 4, wherein the scene feature quantities are calculated based on the feature quantity concerning an editing effect of the video, and by comparison of the lists of the scene feature quantities, a difference in the editing effects, which are applied to the scenes from the difference in the scene feature quantities of the two videos, is detected to thereby detect a difference in the scene configuration.

6. The feature image detecting apparatus according to claim 4, wherein the scene feature quantities are an average of the feature quantities of a frame image within a scene.

* * * * *